(12) United States Patent
Waldo et al.

(10) Patent No.: US 8,392,456 B2
(45) Date of Patent: *Mar. 5, 2013

(54) SYSTEM AND METHOD FOR INDEXING, SEARCHING AND PRESENTING TECHNICAL CONCEPTS

(75) Inventors: Andrew Waldo, Bethesda, MD (US); Yong Zou, Potomac, MD (US)

(73) Assignee: Decernis, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,573

(22) Filed: Jun. 19, 2012

(65) Prior Publication Data

US 2012/0254160 A1 Oct. 4, 2012

Related U.S. Application Data

(63) Continuation of application No. 12/578,203, filed on Oct. 13, 2009, now Pat. No. 8,229,958.

(60) Provisional application No. 61/104,483, filed on Oct. 10, 2008.

(51) Int. Cl.
*G06F 17/30* (2006.01)

(52) U.S. Cl. ...................................... 707/780; 707/722

(58) Field of Classification Search .................. None
See application file for complete search history.

(56) References Cited

U.S. PATENT DOCUMENTS 7,937,402 B2  5/2011  Feng et al.
2008/0077570 A1  3/2008  Tang et al.

*Primary Examiner* — Wilson Lee
*Assistant Examiner* — Alexander Khong
(74) *Attorney, Agent, or Firm* — Crowell & Moring LLP

(57) ABSTRACT

A data processing system and method are provided to index, search and present information about defined, "fuzzy" concepts across language, chemical and product identity, composition, biological classification and legal reference. The database system and method permits the use of combinations of concepts, such as labeling, health claims and/or nutritional claims, across linguistic, scientific and legal usages. The user is able to search for concepts in a defined way across any language or means of reference. The definition of the concepts used in the database is accepted as a standard by the database system (user(s)). Such standardization then permits one user to pass the results of a search to another user with common meaning, and permits value-added services, such as the capability to provide news services about changes in worldwide regulation of goods and services, i.e., changes in information applicable to the concepts of interest to specific users.

15 Claims, 2 Drawing Sheets

SYSTEM AND METHOD FOR INDEXING, SEARCHING AND PRESENTING TECHNICAL CONCEPTS

CROSS-REFERENCE TO RELATED APPLICATIONS

This is a continuation application of U.S. application Ser. No. 12/578,203, filed Oct. 13, 2009, which is a non-provisional application claiming priority to U.S. provisional application Ser. No. 61/104,483, filed Oct. 10, 2008, the entire disclosure of which is expressly incorporated by reference herein.

BACKGROUND OF THE INVENTION

The present invention is directed to a data processing system to index, search, and present information about defined, "fuzzy" concepts across language, chemical and product identity, composition, biological classification, and legal reference. In global commerce today, a decision often requires information that the user can most easily describe as a concept term or combination of terms, especially in technical areas, for example, regulatory compliance with product safety requirements for foodstuffs and chemicals. For example, the user may need to know all the requirements applicable to labeling of a product, or restrictions on health and nutritional claims for additives to a foodstuff. The database system of the present invention permits the use of a combination of concepts—labeling, health claims, nutritional claims—across linguistic, scientific, and legal usages. The benefit is thus for the user to be able to search for concepts in a defined way across any language or means of reference. Importantly, the definition of the concepts used in the database is accepted as a standard by the user(s) of the database system. Such standardization of definition then permits one user to pass the results of a search to another user with common meaning. In addition it permits value-added services, such as the capability to provide news services about changes in worldwide regulation of health claims, i.e., changes in information applicable to the concept.

Although the use of a general database including semantic relationships is well known in prior art, the database system of the present invention discloses a method to index, search, and present information, which is novel. The invention defines the concepts in a manner intended to provide a standard usage among users. It applies across language and scientific nomenclature, and can be used in important global business problems where fuzzy questions are essential to decision-making, for example, in the regulation of food and product safety.

The invention allows a much more precise means of defining the information set necessary to a decision. To be able to retrieve a clustered set of information, for example in an Internet search, through the use of such conceptual terms provides an extremely rapid way to search for and receive information within highly defined technical areas. In addition it permits information about changes relative to defined conceptual terms to be searched and presented. Further, it permits expert rules to control actions based on the use of the database system as disclosed in the invention.

For instance, a compliance manager might want information about labeling requirements for sodium chromate. Labeling requirements may be considered a conceptual term—"label"—that might include literal translations, such as étiquette in French or štítek in Czech, but labeling might also be associated with legal citations, such as 21 CFR 1910.1200 or Council Directive 67/548 in the European Union. "Sodium chromate" can also be considered as a conceptual term for a chemical substance that encompasses translations: Chromate de sodium, Natriumchromat, synonyms, identifiers, as well as broad chemical groups of which sodium chromate is a member, such as Acido crómico y cromatos and Chrom (VI)-verbindungen, and Hexavalent Chromium Compounds. An embodiment of the invention would permit the user to search for the combination of conceptual terms and receive hyperlinks to relevant documents in the Intenet that would present a global view of labeling requirements for sodium chromate. The present invention allows information about these concepts to be indexed, searched, and presented in a way that provides a comprehensive approach for the user than the State of the Art.

In another example, a beverage manufacturer might be interested in information about requirements for thresholds for "contaminants" in "100% fruit juice". "Contaminants" as a concept may include nested sub-concepts such as "dioxins", "PCB's", "heavy metals", "microbiological contaminants", "pesticide residures", etc. Each of these concepts can have members that cross language, synonymous references, legal citation, or other technical identification. "100% fruit juice" may be considered as a set of fruits, orange, lime, cranberry, which themselves have linguistic, synonymous and other technical identification.

DETAILED DESCRIPTION OF THE INVENTION

"Concept." As used in this document a Concept is a categorization of a set of information, materials, or attributes across language, nomenclature, or regulation for which the definition is agreed upon by the user(s) of the database system. The concept "label" once defined within the database system for a community of users permits benefits, such as a search for information across any language for information about labeling restrictions in a common way. Further, information retrieved about "labeling" can be passed to another user in a common way. Finally, value-added services, such as news about world-wide changes in "labeling" restrictions, become possible with much greater certainty to support business decisions.

"Member Term." As used in this document a Member Term can be one of a child or parent concept of a concept, a synonym, grammatical variation, translation, identifier, ingredient, and component. Attributes of a Member Term can include a URL, document name, file, hyperlink, location, remote function call, automated rule, and function.

One embodiment of the present invention is a database system that stores cross-references between Concepts, Member Terms, and attributes of Member Terms. The Concept database is comprised of the following steps:
   a. Concepts are identified and added to a database;
   b. Member Terms are identified and indexed from a computer-readable document;
   c. Member Terms are associated with a Concept;
   d. A Member Term record with its associated Concept is added to the database. A Member Term record may include one or more of of a URL, document name, file, hyperlink, location, remote function call, automated rule, and function the Member Terms;
   e. The database is indexed to permit searching.

One embodiment of the database system according to the invention includes a search application that permits a search for a Concept or a Member Term by a user that can be a human user. The search application comprises the following steps:

a. A user enters into an Internet Browser one or more of a Concept, Member Term, or attributes of a Member Term;
b. A query of the database system searches for relevant attributes of Member Terms and Concepts matching the parameters of the query.
c. A response is returned to the user.

Another embodiment of the database system includes a search application that permits a search for a Concept or a Member Term executed by another system. The search application comprises the following steps:
a. The first system enters a network and logs in to the second database system;
b. The first system passes a defined query as a request to the second database system that includes a Concept or Member Term or attribute of a Member Term
c. A query of the second database system searches for relevant attributes of Member Terms and Concepts matching the parameters of the query.
d. A response is returned by the second database system to the first system.

Another embodiment of the database system is a presentation and formatting of information about Concepts, Member Terms, and attributes of Member Terms that allows the user a customized view of such information.

The storage of member term includes one or more of a URL, document name, file, hyperlink, location, remote function call, automated rule, and function. The database system includes an index between concepts and member terms. As a result, in one embodiment, a search for a concept will return hyperlinks to all documents in whatever language, using whatever synonym or relationship as described below that represent the found member terms of a concept like "label".

Another embodiment of the database system includes a change management index that stores changes in member terms and attributes of member terms within any concept. Another embodiment of the invention is a database system of concepts that includes one of a function, rule, and hyperlink that is executed on a query of one of a concept, combination of concepts, member terms, attributes of member terms, combination of concepts and member terms, and combination of concepts, member terms, and attributes.

Another embodiment of the database system is a search application for the stored concepts, member terms, and attributes that returns to the user one of all and a subset of references from the database.

Another embodiment of the database system is a presentation of the information to the user to permit a review of concepts.

One embodiment of a member term of a concept includes a literal synonym or identifier. An example of a concept is a "material safety data sheet". Literal synonyms include "MSDS", "SDS", and "safety data sheet".

Another embodiment of a member term of a concept includes a translation. An example of a concept includes: "label". Member terms of this concept include "etiquette" in French and štítek in Czech.

Another embodiment of a member term of a concept includes a citation or reference. An example of a concept includes the term "label" of which "21 CFR 1910.1200" and "Council Directive 67/548" in the European Union are member terms. An embodiment of the database system permits the indexing of member terms of concepts so that a search for the member reference, for example the member term of label in Czech, "štítek", would return "21 CFR 1910.1200" and "Council Directive 67/548".

Another embodiment of a member term of a concept includes chemical and biological synonyms. For example, DDT may be considered a concept. 1,1,1-Trichloro-2,2-bis (4-chlorophenyl) ethane is a member term of this concept as well as para,para'-Dichlorodiphenyltrichloromethylmethane and p,p'-DDT. An embodiment of a chemical concept includes translated member terms. Acetic acid is an example of a concept and Ácido acético in Spanish is a member term as would be Ättiksyra in Finnish.

Another embodiment of a member term of a concept includes the components and ingredients of one of a product, formulation, recipe, structure, and organism. For instance, the concept "Soft Drink A" can include the member terms, "caffeine", "carbonated water", "caramel", and "sodium benzoate".

Another embodiment of a member term of a concept includes parent groups or alternatively children of a parent group. "Sodium chromate" can also be considered as a conceptual term for a chemical substance. An example of a parent group that references this concept is hexavalent chromium compounds. Another example of such a parent group is Chrome VI, composés solubles dans l'eau en Cr (non classés ailleurs). The member term can attribute a result or effect. For instance, "carcinogenic substances" is a member term of the concept "Sodium chromate".

Another embodiment of a concept includes biological organisms, agents, or extracts. For example, a concept includes "100% fruit juice". Member terms include: "orange juice", "cranberry juice", etc.

Another embodiment of a concept includes attributes of member terms. For instance, "carcinogenic substances" is a member term of the concept "Sodium chromate". "Contaminants" as a concept includes nested sub-concepts such as "dioxins", "PCB's", "heavy metals", "microbiological contaminants", "pesticide residues", etc. Each sub-concept then would have its own member terms.

An embodiment of the invention includes a database system in which the member terms of a concept are indexed to find occurrences within documents or files. The location of the occurrence of the member term is stored within a database system.

A further embodiment indexes the member terms of a concept to include one of a URL, hyperlink, remote function call, automated rule, and function associated with the member term. In this manner, the concept "label" can retrieve, for instance, all documents with any synonym, translation, relevant citation found on the Internet. The location of the associated information is then stored in a database.

An embodiment of the invention includes a database system in which the member terms of a concept are indexed against changes that have occurred in documents or files that have been updated since the last time that an indexing step occurred. For example, the European Union has amended its requirements of permitted substances used in food contact applications. In one embodiment of an index using the present invention, the concept indexed is "Food Contact" of which its member terms include "2007/42/EC", the principal European Directive governing food contact applications. Amendments to 2007/42/EC, such as Directives 92/39/EEC, 93/9/EEC, 95/3/EEC, 96/11/EEC, 1999/91/EC, 2001/62/EC and 2002/17/EC represent changes to a member term of the concept. Each amendment is added to the membership of the concept in the database. One embodiment of the invention includes a change management index that stores changes to member terms of a concept. Such changes would include additions, deletions, and modifications. In the above example, changes to the concept "Food Contact" would include any amendments published within the period of time covered by the search.

101. The user has agreed to use the Concept Search, here termed a "synonym search" in this embodiment.

102. The user has entered the search terms, strawberry and vitamin C. These searches are Concepts.

103. The user has selected a series of topics of interest to define the scope of the search.

104. The user has selected a series of countries of interest to define the scope of the search.

105. The search using one embodiment of the invention has returned a record for display by one embodiment of the presentation method of the invention. In this case, a filter for Germany has returned a document where the Member Terms belonging to the Concepts are: Erdbeere is a Member Term of the Concept, strawberry. In this case it is a translation. L-Ascorbinsauere is a Member Term, which is a synonym of the Concept, vitamin C.

106. The hyperlink to the document returns a German regulation applicable to the entered Concepts. The hyperlink is an attribute of the combination of Member Terms.

Figure 1:
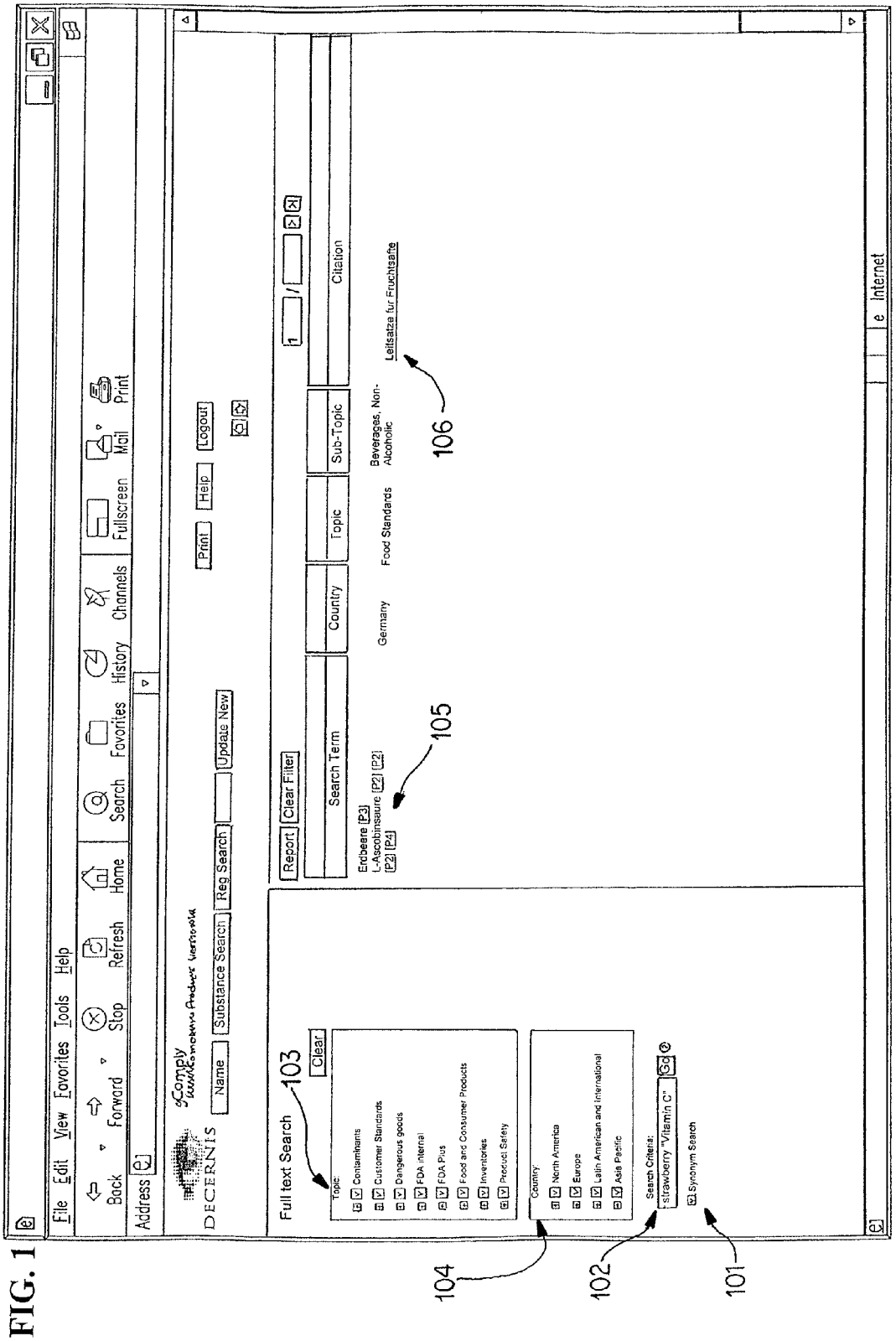
FIG. 1 presents one embodiment of the invention where a collection of regulatory documents have been indexed, the user has performed a search for regulations applicable to "strawberry" and "Vitamin C", and an application has presented the search results in a manner for ease of interpretation by the user. The FIG. 1 reference labels refer to the following.
Figure 2:
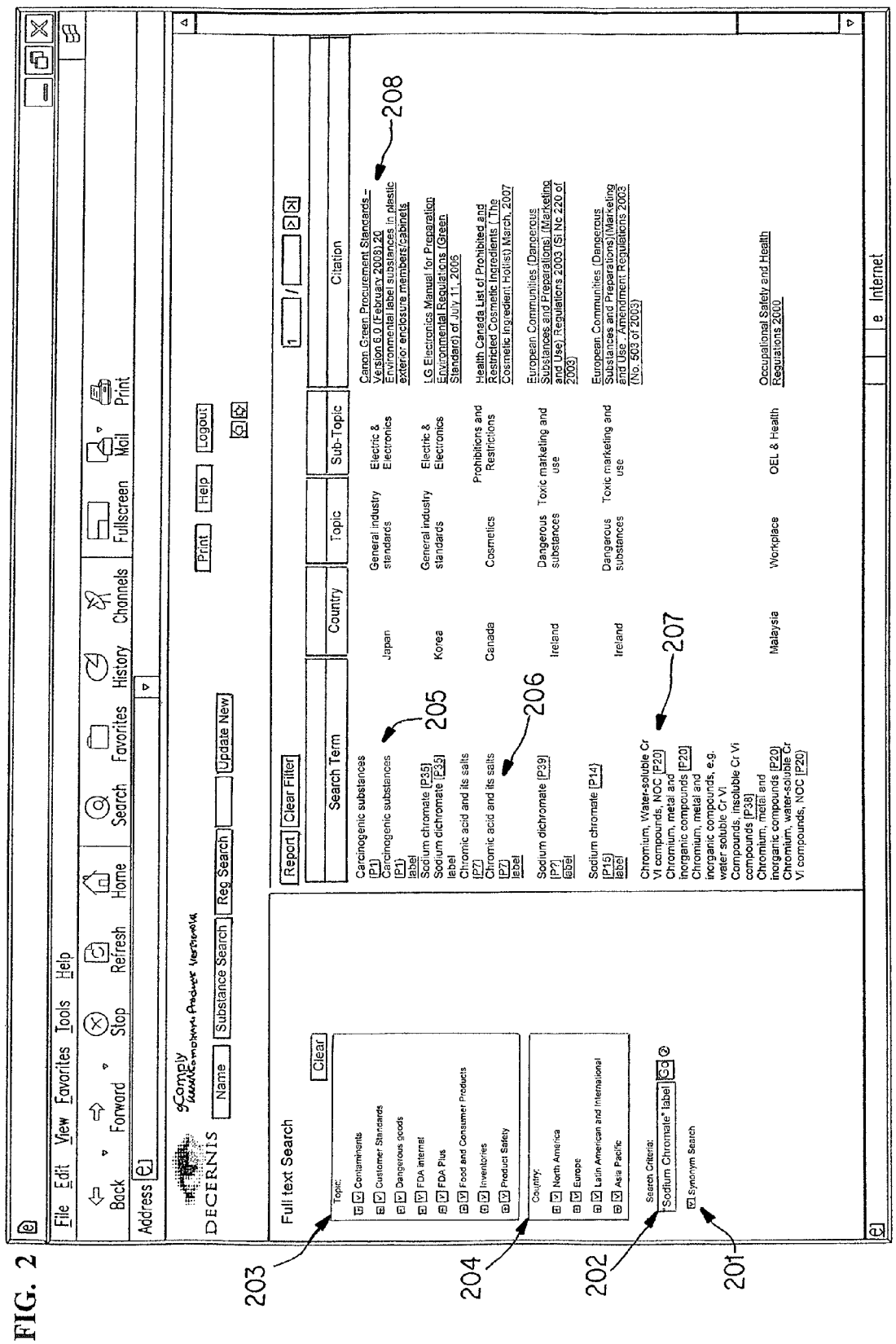

FIG. 2 presents another embodiment of the invention in which a collection of regulatory documents have been indexed, the user has performed a search for regulations applicable to "sodium chromate" and "label", and an application has presented the search results in a manner for ease of interpretation by the user. The FIG. 2 reference labels refer to the following:

201. The user has agreed to use the Concept Search, here termed a "synonym search" in this embodiment.

202. The user has entered the search terms, sodium chromate and label. These searches are Concepts.

203. The user has selected a series of topics of interest to define the scope of the search.

204. The user has selected a series of countries of interest to define the scope of the search.

The search using one embodiment of the invention has returned a series of records for display by one embodiment of the presentation method of the invention. In this case, "carcinogenic substances" is a sub-Concept that is itself a Member Term of the Concept, "sodium chromate". The Concept, label, is also returned where "label" is itself a Member Term of the Concept, "label", i.e., it references an explicit occurrence of a Member Term of the same name. 205 Chromic acid and its salts is a group that is a Member Term of the Concept, sodium chromate. 206 Similarly, Chromium Water Soluble Cr VI Compounds is a group that is a Member Term of the Concept, sodium chromate. In all of these examples, the search has returned hyperlinks to files that may reside on the Internet, in another database, or which prompt another action or rule as disclosed in the invention.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

What is claimed is:

1. A method for presenting technical concepts in a compliance decision assistance system, comprising the steps of:
   populating a concept relation database maintained on a network-accessible computer with concepts, member terms and attributes of member terms, wherein
      the concepts are a categorization of a set of information, materials and attributes across at least one of language, nomenclature and regulations which correspond to user-predetermined definitions,
      the member terms are associated with at least one of the concepts, in that the member terms are at least one of a synonym, grammatical variation, translation, identifier, ingredient, component, organism, agent, extract or parent or child concept of the concept, and
      attributes of member terms are at least one of characteristics and functions associated with at least one of the member terms, including at least one of a universal resource locator, a document name, a file, a hyperlink, a location, a remote function call, an automated rule and a function to be executed;
   identifying and indexing computer-readable documents relevant to predetermined user interests for inclusion in the concept relation database;
   storing concepts, member terms and attributes of member terms identified in the computer-readable documents in the concept relation database;
   initiating a search query of the concept relation database to identify responsive indexed computer-readable documents relevant to determining compliance with a control requirement applicable to at least one of an article, a material, a food, a biological agent, a biological organism, a chemical substance, a physical property and a toxicological property by entering at least one of the concepts, the member terms and the attributes of member terms associated with the at least one of an article, a material, a food, a biological agent, a biological organism, a chemical substance, a physical property and a toxicological property into a search interface;
   searching the concept relation database using the entered at least one concept, member term and attribute of member terms, wherein the search includes use of concepts, member terms and attributes of member terms identified in the concept relation database as being associated with the at least one concept, member term and attribute of member terms entered in the search query, including concepts, member terms and attributes of member terms related by a parent-child relationship; and
   presenting search results in a human-readable form identifying the indexed computer-readable documents responsive to the search query and providing hyperlinks selectable to permit a user to at least one of obtain additional information associated with the selected computer-readable document and activate a predetermined function associated with the computer-readable document,
   wherein the search results include hyperlinks to synonyms of member terms and attributes of member terms associated with the concepts, member terms and attributes of member terms included in the search query.

2. The method of claim 1, wherein
the step of presenting search results includes presenting the search results in a user-customized presentation view.

3. The method of claim 1, further comprising the step of:
accessing the network-accessible computer over a network from a separate user computer;
wherein
the step of initiating the search query is performed by passage of the search query from the separate user computer to the network-accessible computer, and
the step of presenting search results in a human-readable form is performed by passage of the search results over the network from the network-accessible computer to the separate user computer.

4. The method of claim 1, further comprising the step of:
identifying and indexing at least one of changes to and replacements for the computer-readable documents; and
storing at least one of concepts, member terms and attributes of member terms identified in the computer-readable documents in the concept relation database.

5. The method of claim 1, wherein
the member term includes at least one of a literal synonym and an identifier of the at least one of the concepts in the search query.

6. The method of claim 1, wherein
the member term includes a translation of at least one of the concepts in the search query.

7. The method of claim 1, wherein
the member term includes a citation to at least one of a government regulation and an industry standard.

8. The method of claim 1, wherein
the member term includes at least one of a chemical and a biological synonym.

9. The method of claim 1, wherein
the member term includes at least one of a component and an ingredient.

10. The method of claim 1, wherein
the member term includes at least one of biological organisms, agents and extracts.

11. The method of claim 1, wherein
the concepts includes at least one characteristic attribute.

12. The method of claim 11, wherein
the characteristic attribute is at least one of a carcinogenic substance and a contaminant.

13. The method of claim 1, wherein
the step of storing at least one of concepts, member terms and attributes of member terms identified in the computer-readable documents in the concept relation database includes storing at least one location of a member term in one of the computer-readable documents in the concept relation database.

14. A system for presenting technical concepts, comprising:
a network-accessible computer;
a computer-readable media containing a concept relation database and program for indexing, searching and presenting the technical concepts; and
a human-readable display on which search results are presented,
wherein the program for indexing, searching and presenting the technical concepts is configured to
receive for populating the concept relation database at least one of concepts, member terms and attributes of member terms, wherein
the concepts are a categorization of a set of information, materials and attributes across at least one of language, nomenclature and regulations which correspond to user-predetermined definitions,
the member terms are associated with at least one of the concepts, in that the member terms are at least one of a synonym, grammatical variation, translation, identifier, ingredient, component, organism, agent, extract or parent or child concept of the concept, and
attributes of member terms are at least one of characteristics and functions associated with at least one of the member terms, including at least one of a universal resource locator, a document name, a file, a hyperlink, a location, a remote function call, an automated rule and a function to be executed,
identify and index computer-readable documents relevant to predetermined user interests for inclusion in the concept relation database,
store at least one of concepts, member terms and attributes of member terms identified in the computer-readable documents in the concept relation database,
receive a search query of the concept relation database comprising at least one of the concepts, the member terms and the attributes of member terms entered into a search interface,
execute a search of the concept relation database based on the received search query to identify responsive indexed computer-readable documents relevant to determining compliance with a control requirement applicable to at least one of an article, a material, a food, a biological agent, a biological organism, a chemical substance, a physical property and a toxicological property, wherein the search includes use of concepts, member terms and attributes of member terms identified in the concept relation database as being associated with the at least one concept, member term and attribute of member terms entered in the search query, including concepts, member terms and attributes of member terms related by a parent-child relationship; and
present search results in a human-readable form identifying the indexed computer-readable documents responsive to the search query and providing hyperlinks selectable to permit a user to at least one of obtain additional information associated with the selected computer-readable document and activate a predetermined function associated with the computer-readable document,
wherein the search results include hyperlinks to synonyms of member terms and attributes of member terms associated with the concepts, member terms and attributes of member terms included in the search query.

15. The system of claim 14, further comprising:
a separate user computer,
wherein
the separate user computer is configured to pass the search query over a network to the network-accessible computer, and
the human-readable display is associated with the separate user computer, and
the network-accessible computer is configured to pass the search results over the network to the separate user computer.

* * * * *